US009853901B2

(12) United States Patent
Kampmann et al.

(10) Patent No.: US 9,853,901 B2
(45) Date of Patent: Dec. 26, 2017

(54) CENTRALIZED CONTROL OF DATA PLANE APPLICATIONS

(75) Inventors: Dirk Kampmann, Vaals (NL); Srinivas Kadaba, Herzogenrath (DE); Andreas Witzel, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 478 days.

(21) Appl. No.: 14/239,210

(22) PCT Filed: Aug. 18, 2011

(86) PCT No.: PCT/EP2011/064249
§ 371 (c)(1),
(2), (4) Date: Apr. 9, 2014

(87) PCT Pub. No.: WO2013/023704
PCT Pub. Date: Feb. 21, 2013

(65) Prior Publication Data
US 2014/0219094 A1    Aug. 7, 2014

(51) Int. Cl.
*H04L 12/26*    (2006.01)
*H04L 12/801*   (2013.01)
(Continued)

(52) U.S. Cl.
CPC .............. *H04L 47/14* (2013.01); *H04L 45/42* (2013.01); *H04L 45/64* (2013.01)

(58) Field of Classification Search
CPC ......... H04L 45/64; H04L 45/42; H04L 47/14; H04L 47/35; H04L 47/10; H04L 47/30; H04L 5/0053; H04L 47/03
See application file for complete search history.

(56) References Cited

U.S. PATENT DOCUMENTS

| 7,369,489 B1* | 5/2008 | Bhattacharya .......... H04L 47/10 370/230 |
| 2002/0027887 A1* | 3/2002 | Moriya ................. H04L 45/122 370/256 |

(Continued)

FOREIGN PATENT DOCUMENTS

| WO | 2011056673 A1 | 5/2011 |
| WO | 2011083682 A1 | 7/2011 |

OTHER PUBLICATIONS

Wolf, T., "In-Network Services for Customization in Next-Generation Networks," IEEE Network; Jul.-Aug. 2010. pp. 6-12. vol. 24, Issue 4.

(Continued)

*Primary Examiner* — Ricky Ngo
*Assistant Examiner* — Phong La
(74) *Attorney, Agent, or Firm* — Murphy, Bilak & Homiller, PLLC (57) ABSTRACT

The invention relates to a central control entity (200) configured to control a data plane flow of a stream of data packages in a radio access network part of a mobile communications network. The central control entity (200) comprises an information detecting unit (210), configured to detect information about data plane applications (41-44) attached to forwarding elements (120-124; 131-134) of the radio access network part and configured to detect information about at least one data plane application (41-44) that is to be applied to said data plane flow. Furthermore, the central control entity (200) comprises a control unit (230), configured to determine a path of the data plane flow through the forwarding elements (120-24; 131-134) of the radio access network part, wherein the control unit (230) is configured to determine the path taking into account said at least one data plane application (41-44) to be applied to said data plane flow, the control unit (230) being further config- (Continued)

ured to instruct the forwarding element in the path, to which said at least one data place application is attached, to pass the data plane flow through said at least one data plane application (41-44).

14 Claims, 11 Drawing Sheets

(51) Int. Cl.
*H04L 12/715* (2013.01)
*H04L 12/717* (2013.01)

(56) References Cited

U.S. PATENT DOCUMENTS

| | | | | |
|---|---|---|---|---|
| 2002/0038339 A1* | 3/2002 | Xu | .......... | H04L 29/06 709/203 |
| 2003/0156541 A1* | 8/2003 | Haihong | .......... | H04L 12/5695 370/235 |
| 2004/0039820 A1 | 2/2004 | Colby et al. | | |
| 2004/0131079 A1* | 7/2004 | Hegde | .......... | H04L 45/50 370/466 |
| 2004/0174883 A1* | 9/2004 | Johansson | .......... | H04L 45/302 370/395.31 |
| 2005/0041583 A1* | 2/2005 | Su | .......... | H04L 43/065 370/235 |
| 2005/0094557 A1* | 5/2005 | Chen | .......... | H04L 12/1868 370/229 |
| 2005/0122900 A1* | 6/2005 | Tuulos | .......... | H04L 12/5695 370/229 |
| 2005/0243852 A1* | 11/2005 | Bitar | .......... | H04L 49/602 370/422 |
| 2007/0242738 A1 | 10/2007 | Park et al. | | |
| 2008/0049638 A1* | 2/2008 | Ray | .......... | H04L 41/0896 370/252 |
| 2009/0003375 A1* | 1/2009 | Havemann | .......... | H04L 45/00 370/463 |
| 2009/0141721 A1* | 6/2009 | Filsfils | .......... | H04L 45/50 370/392 |
| 2009/0279449 A1* | 11/2009 | Kneckt | .......... | H04W 52/0251 370/253 |
| 2009/0310610 A1* | 12/2009 | Sandstrom | .......... | H04L 45/00 370/392 |
| 2010/0067380 A1* | 3/2010 | Teng | .......... | H04L 47/10 370/235 |
| 2010/0121972 A1* | 5/2010 | Samuels | .......... | H04L 41/082 709/231 |
| 2010/0157821 A1* | 6/2010 | Morris | .......... | H04L 45/00 370/252 |
| 2010/0322255 A1* | 12/2010 | Hao | .......... | G06F 9/45558 370/398 |
| 2011/0096732 A1* | 4/2011 | Rashid | .......... | H04L 47/10 370/329 |
| 2012/0020361 A1* | 1/2012 | Ueno | .......... | H04L 49/50 370/400 |
| 2012/0257529 A1* | 10/2012 | Ehara | .......... | H04L 12/66 370/252 |
| 2012/0300615 A1* | 11/2012 | Kempf | .......... | H04W 24/02 370/216 |
| 2012/0303835 A1* | 11/2012 | Kempf | .......... | H04W 24/02 709/235 |
| 2013/0058215 A1* | 3/2013 | Koponen | .......... | H04L 12/4633 370/241 |
| 2013/0086295 A1* | 4/2013 | Hidaka | .......... | G06F 13/4022 710/313 |

OTHER PUBLICATIONS

Author Unknown, "Forwarding and Control Element Separation (forces)", IETF. http://datatracker.ietf.org/wg/forces/. Mar. 19, 2014. pp. 1-1. Version 5.2.0.
Author Unknown, "Open Networking Foundation", http://www.opennetworkingfoundation.org/. 2014. pp. 1-2.
Author Unknown, "OpenFlow", OpenFlow Switch Specification, Version 1.1.0. Enabling Innovation in Your Network. Archive. htpp://www.openflow.org/. 2011. pp. 1-3.

* cited by examiner

CENTRALIZED CONTROL OF DATA PLANE APPLICATIONS

TECHNICAL FIELD

The present invention relates to a central control entity configured to control a data plane flow of a stream of data packages in a radio access network part of a mobile communications network, to a method for controlling the data plane flow by the central control entity and to a forwarding element of the radio access network part forwarding the data plane flow.

BACKGROUND

Figure 1:
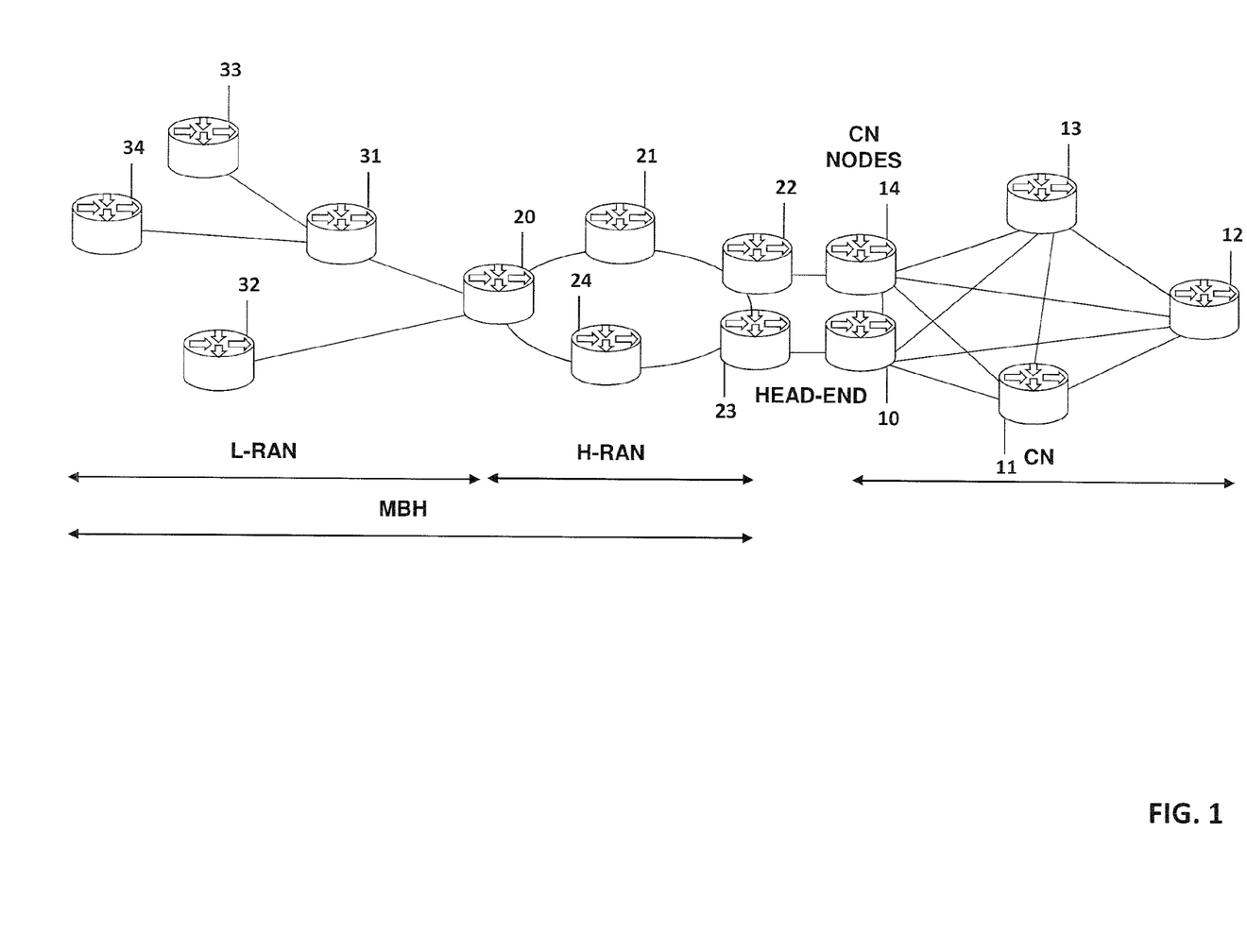
FIG. 1 shows a network architecture known in the prior art.

Today's mobile backhaul (MBH) networks/radio access networks are usually structured into two parts, the High-RAN (radio access network) and Low-RAN sections, in order to provide connectivity and traffic aggregation for mobile packet data from cell sites to the core network. As can be seen from FIG. 1 the High-RAN part is typically using a ring topology with the network nodes 20 to 24, while the Low-RAN part is using a tree-structure with the network nodes 31 to 34. The cell sites are connected to the Low-RAN. The Low-RAN is typically using microwave links to the access legs of the High-RAN ring. The head-end of the High-RAN ring connects to the core network using core routers, such as routers 10 and 14 placed on the core site. The edge router connects as well to the core network CN via at least two independent links as shown in FIG. 1.

Furthermore, a split router architecture is known in which a common router is split into two elements, as known inter alia from a ForCES documentation in IETF at http://datatracker.ietf.org/wg/forces/.

- a control element (CE) responsible to manage the routing protocol and the connectivity of the data plane. The control element controls the data plane connectivity through the forwarding elements (FE).
- the forwarding element responsible to forward traffic in the data plane, the forwarding element establishing the connectivity to neighbor nodes based on instructions received from the control entity.

Furthermore, data plane applications are known in mobile networks. Examples of data plane applications are policy and enforcement functions, service aware traffic shaping, transcoding, transrating, media caching, packet inspection and media proxies, etc. One example of data plane applications is a packet inspection in which the data packets are inspected to identify malicious data. Another data plane application is the counting of data packets for charging functions.

Figure 2:
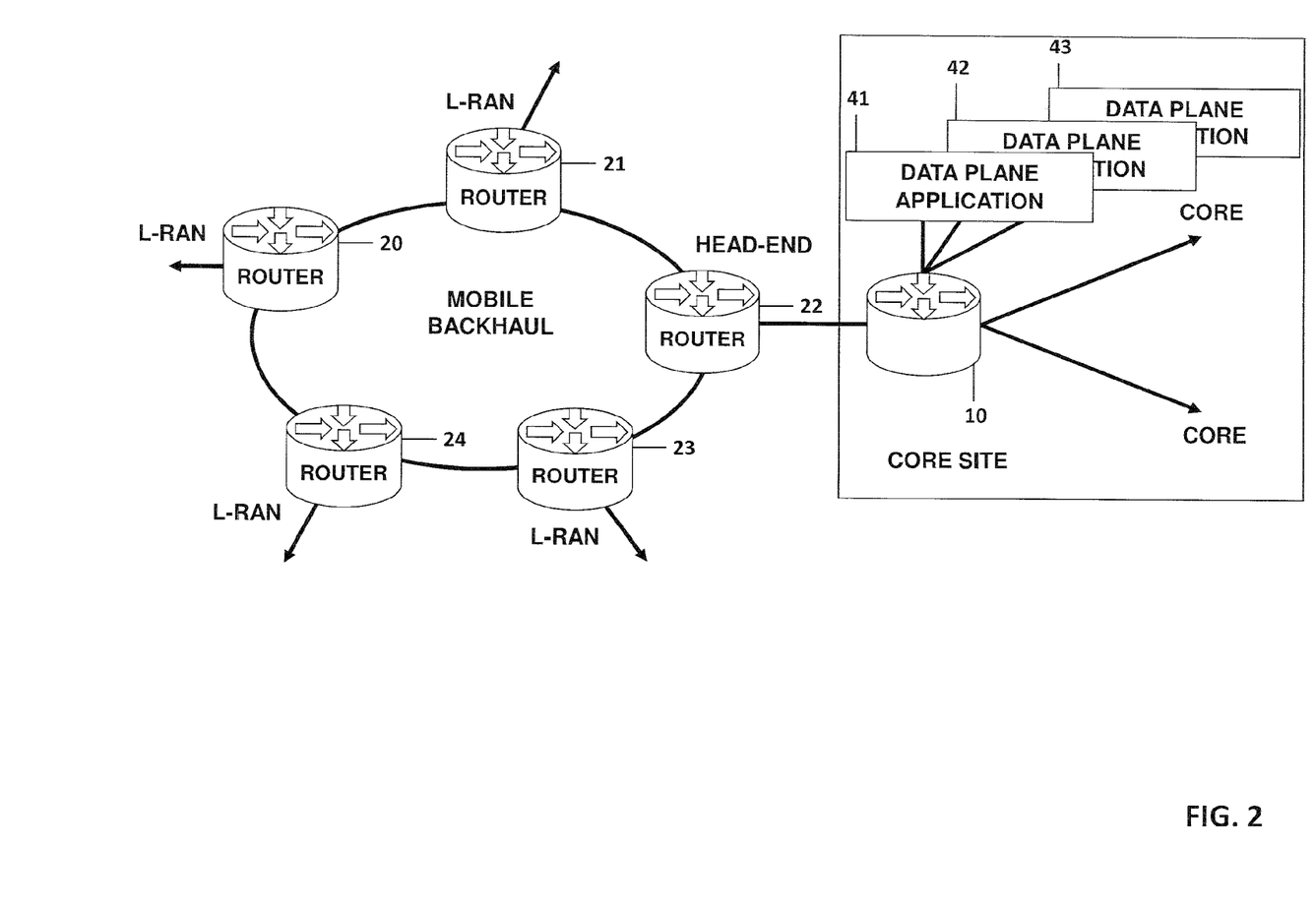
FIG. 2 shows the use of data plane applications as known in the prior art.

In FIG. 2 the location of data plane applications as known from the art is shown. In the left side of FIG. 2, the ring structure of the radio access network part is shown, the right side showing the edge router 10 as connection point to the core network to which data plane applications 41 to 43 are attached. The connection of the data plane applications to the edge router as shown in FIG. 2 has the disadvantage that either more interface cards are required on the router or a site LAN switch is required. Furthermore, routing capacity is needed on the router to loop the data plane flow via several data plane applications. Additionally, the handling of separate entities to host the data plane applications is an additional work for the operators of the network.

Figure 3:
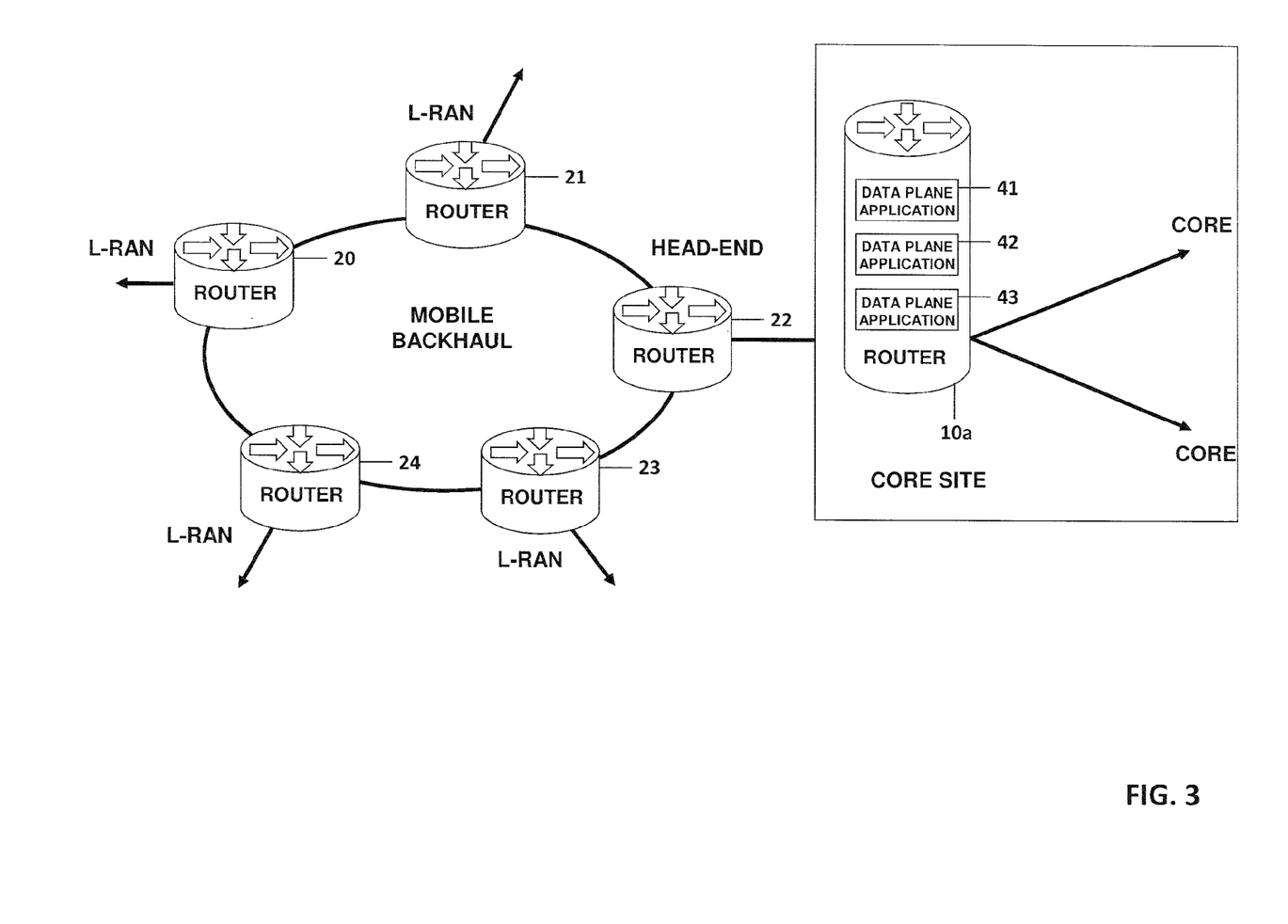
FIG. 3 shows another embodiment of how data plane applications are used in the prior art.

To improve the situation it is known to move the data plane applications into the edge router as shown in FIG. 3 where the data plane applications 41 to 43 are incorporated into router 10a. However, although this simplifies the site as such, the complexity is moved into the router. The router platform is not prepared to host processing intensive functions and the dimensioning of the router has become a problem. Furthermore, scalability issues come up when the data plane flows to be passed through the data plane applications increase.

Thus, the idea to host multiple data plane applications on the router as shown in FIG. 3 may be a short time solution, but does not scale into the future especially with the predicted increase of packet traffic volume.

The increasing need for multiple data plane applications and increasing mobile packet data traffic causes scalability and cost problems for the edge routers and the data plane applications.

SUMMARY

Accordingly, a need exists to allow the effective application of data plane applications to the data plane flow for high flow rates.

This need is met by the features of the independent claims. In the dependent claims preferred embodiments of the invention are described.

According to a first aspect of the invention, a central control entity is provided configured to control a data plane flow of a stream of data packages in a radio access network part of a mobile communications network. The central control entity comprises an information detecting unit, configured to detect information about data plane applications attached to forwarding elements of the radio access network part and configured to detect information about at least one data plane application that is to be applied to said data plane flow. The central control entity furthermore contains a control unit configured to determine a path of the data plane flow through the forwarding elements of the radio access network part. The control unit is configured to determine the path taking into account said at least one data plane application to be applied to said data plane flow, the control unit being further configured to instruct the forwarding element in the path, to which said at least one data place application is attached, to pass the data plane flow through said at least one data plane application. The central control entity controls the utilization of the data plane applications spread out in the radio access network part. The data plane applications are attached to different forwarding elements of the radio access network part. As the data plane applications can be spread over the access radio network part and as the utilization of the data plane applications is controlled by the central control entity, an increased number of data plane flows can be handled effectively.

It is possible that more than one data plane application should be applied to a data plane flow. The information detecting unit may in this context be configured to determine the data plane applications to be applied to the data plane flow and the control unit can be configured to instruct the forwarding elements to pass the data plane flow through the corresponding data plane applications. The control unit of the central control entity can control the data plane flow in such a way that all the needed data plane applications are passed so that all the required data plane applications can be applied to the data plane flow.

Furthermore, it is possible that the different data plane applications should be passed in a predefined order. In this example, the control unit may be configured to determine the path through the forwarding elements, to which the determined data plane applications are attached, in such a way that the data plane applications are applied to said data plane flow in the predefined order. Thus, the control unit can control the data plane flow in such a way that the data plane applications that need to be applied to the data plane flow are applied in the required or desired order.

The central control entity, and especially the information detecting unit may be configured in such a way that it is able to detect information about a topology of the radio access network part. When the control unit determines the path of the data plane flow through the forwarding elements, information about the topology of the radio access network part may be needed to correctly determine the path.

Furthermore, it is possible that the information detecting unit detects information about load feedback from the data plane applications attached to the forwarding elements. The central control entity can be informed of the current load of the data plane applications and can consider this load when determining the path of the data plane flow. By way of example, when one data plane application is attached to different forwarding elements, the control unit of the central control entity may determine the path of the data plane flow taking into account the load feedback from the different forwarding elements for said one data plane application attached to the different forwarding elements. When the load feedback for one data plane application attached to a forwarding element is high and when the load feedback for the same data plane application attached to another forwarding element is low, the control unit can determine the path of the data plane flow in such a way that the data plane application having a low load is used.

The forwarding elements in the radio access network part may be arranged in a ring topology or tree topology. However, it should be understood that the control unit may control the forwarding elements for any possible topology used in the radio access network part.

The control unit can be configured to provide a path for the data plane flow through the data plane and the control unit may instruct the forwarding elements how to forward the data plane flow by providing commands to a forwarding table provided in a forwarding element. The forwarding element then uses the received commands stored in the table to forward the data plane flow to the next node.

In one embodiment, the control unit may even be configured to attach a data plane application to a forwarding element of the radio access network part.

The invention furthermore relates to a method for controlling the data plane flow by the central control entity, the method comprising the steps of detecting information about data plane applications attached to forwarding elements of the radio access network part. Furthermore, information about at least one data plane application that is to be applied to said data plane flow, is detected and a path of the data plane flow is determined through the forwarding elements of the radio access network part, the path being determined taking into account said at least one data plane application to be applied to said data plane flow. Furthermore, the forwarding element in the path, to which said at least one data plane application is attached, is instructed to pass the data plane flow through said at least one data plane application. This method allows to distribute the data plane applications over the forwarding elements in the radio access network part as the path of the data plane flow is controlled by the central control entity.

The data plane flow can be determined as described above in connection with the central control entity.

The invention is furthermore directed to a forwarding element of the radio access network part comprising a receiver configured to receive instructions from the central control entity controlling the data plane flow of the string of data packages in the radio access network part. A data plane application is attached to the forwarding element and a processing unit is provided configured to pass the data plane flow within the forwarding element and configured to pass the data plane flow through the attached data plane application in accordance with the instructions received from the central control entity. The data plane application may be provided in the forwarding element or may be connected to the forwarding element. The data plane applications are attached to forwarding elements in the radio access network part instead of providing them in the core network.

The forwarding element may comprise a forwarding table containing information to which other node of the mobile communications network the data plane flow should be forwarded. The receiver can receive an updating command for the forwarding table as part of the instructions from the central control entity. The forwarding table may additionally comprise the identification of the data plane flow and the next forwarding element to forward the flow to.

The invention furthermore relates a method for operating the forwarding element of the radio access network part of the mobile communications network, the forwarding element containing the attached data plane application. The method comprises the step of receiving instructions from the central control entity which is controlling the data plane flow of the stream of data packages in the radio access network part. Furthermore, the data plane flow is passed through the attached data plane application in accordance with the instructions received from the central control entity.

BRIEF DESCRIPTION OF THE DRAWINGS

The invention will be described in further detail below with reference to the accompanying drawings, in which.

DETAILED DESCRIPTION

Figure 4:
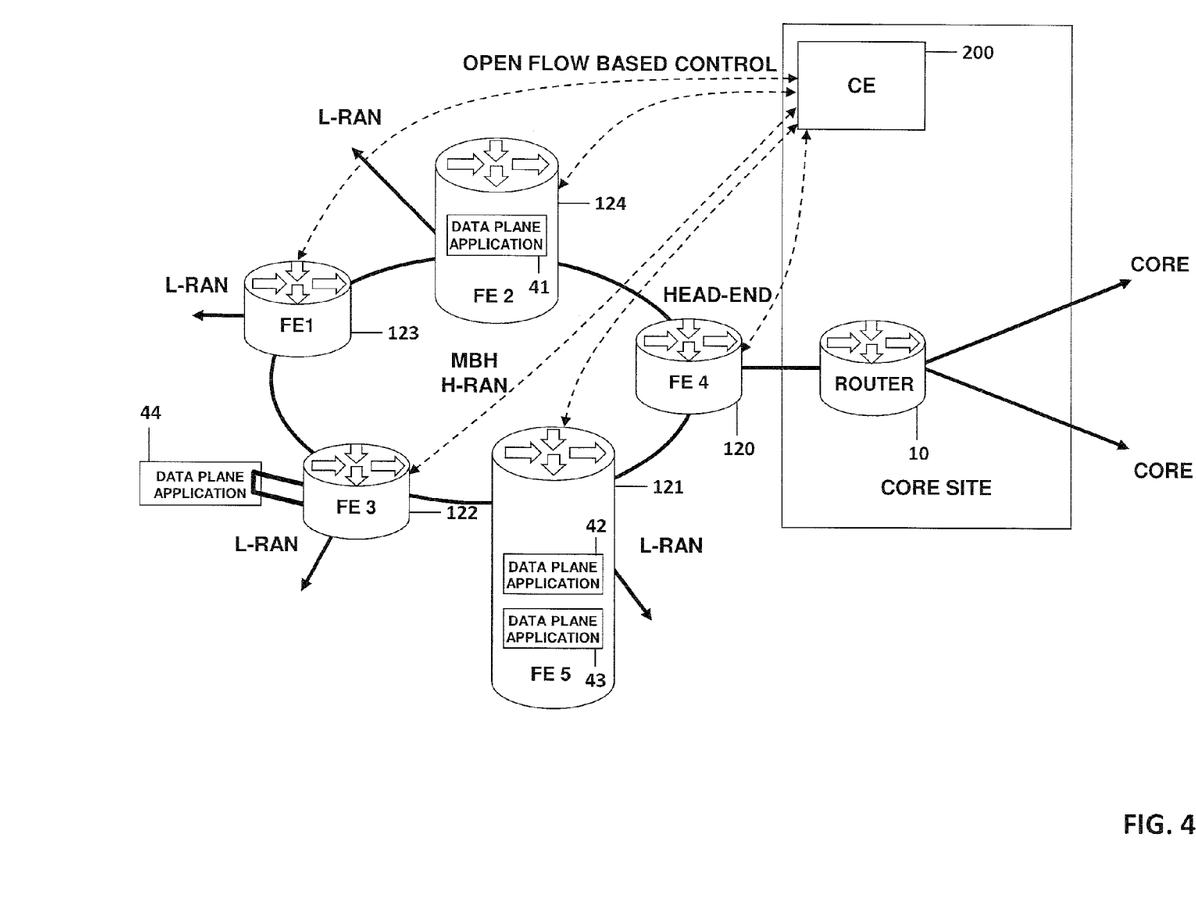
FIG. 4 shows a schematic view of a mobile communications network with a data plane flow being controlled by a central control entity according to one embodiment of the invention.

In FIG. 4 an embodiment of the invention is disclosed, in which the routers in the radio access network part are converted into forwarding elements meaning that they may be expanded with the capability to act as a forwarding element.

In the embodiment shown these forwarding elements FE 1 to FE 4 have the reference numerals 120 to 124. A central control entity 200 is provided to steer the forwarding elements 120 to 124 remotely. In the embodiment shown in FIG. 4 the H-RAN part of the access network is shown, whereas in connection with FIGS. 7 and 8 the Low-RAN part of the access network is shown, both parts being controlled by a single central control element 200 as can also be deduced from FIG. 5. The central control entity 200 controls the data plane flow through the forwarding elements 121-124 arranged in a ring topology. The central control entity 200 furthermore controls the flow through the forwarding elements arranged in a tree topology.

Referring back to FIG. 4, the forwarding elements 121 to 124 have interfaces to the L-RAN trees, while forwarding element 120 constitutes the head-end of the H-RAN ring connected to the core network. The data plane applications 41 to 44 are not placed any more on the core site, but are moved to the radio access network part. In the example shown in FIG. 4 the forwarding element 124 has incorporated data plane application 41, and forwarding element 121 contains data plane applications 42 and 43. Data plane application 44 is connected to the forwarding element. In the example of data plane application 44 the path will go through forwarding element 122 as data plane application 44 needs access to the data plane.

It should be noted that for migration purposes some data plane applications can still be placed at the core network site and are connected as known via the edge router or may be included in the edge router. However, these data plane application were omitted for the sake of clarity.

Data plane applications can be deployed in different ways as shown in FIG. 4. Data plane applications can either be added to an existing forwarding element in the ring, or multiple data plane applications can be added on a forwarding element as is the case in forwarding element 121. Furthermore, the data plane application can be added as separate function as it is the case for data plane application 44. The preference depends on the operator choice, the capabilities of the forwarding element and the data plane application type.

Figure 5:
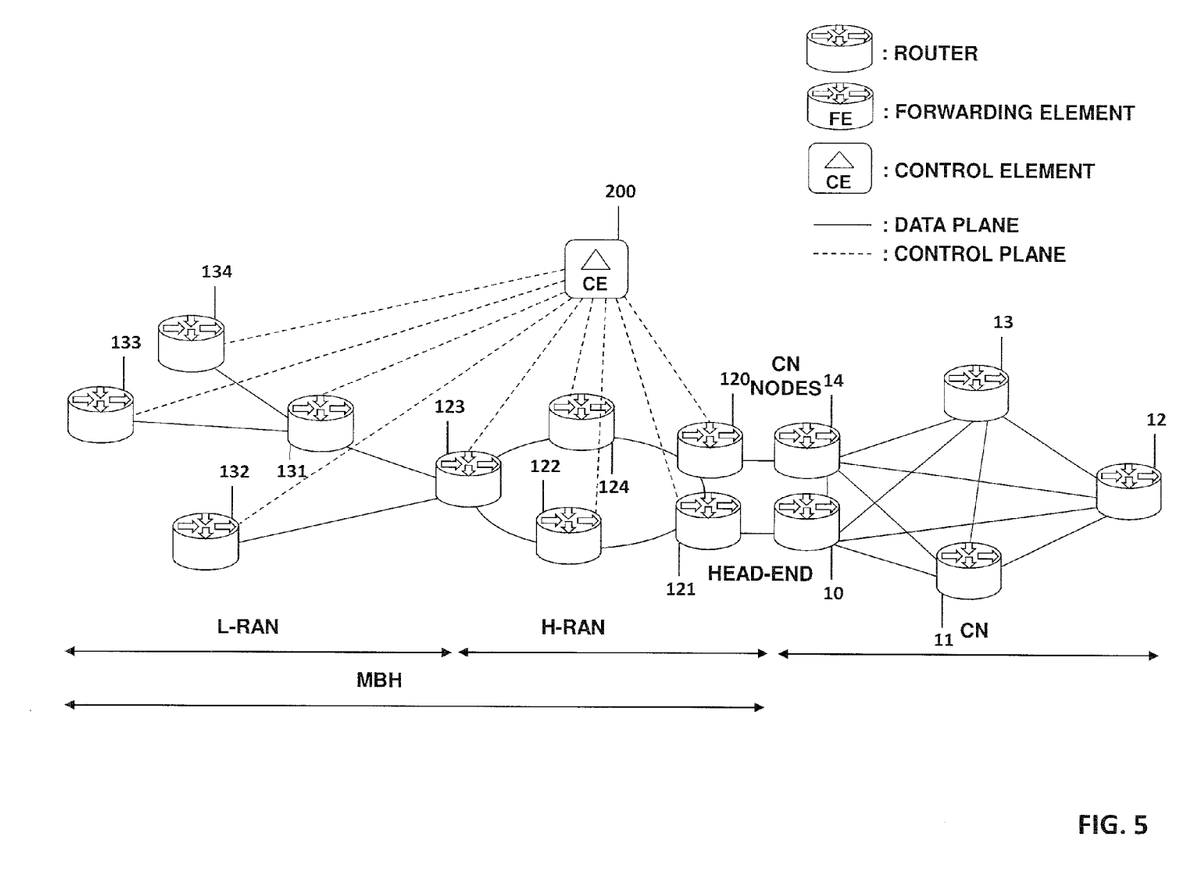
FIG. 5 shows a schematic view of central control entity controlling the forwarding elements.

The central control entity 200 controls the forwarding elements in the H-RAN and the L-RAN as shown in FIG. 5. Furthermore, the central control entity 200 has knowledge about which of the forwarding elements supports which data plane application. This knowledge may be obtained by the central control entity 200 when a forwarding element registers at the central control entity 200. At this time, the entity can perform an audit on the forwarding element and the forwarding element will inform the entity 200 about all functions and devices it can support. When the data plane application is installed next to an forwarding element as for data plane application 44 of FIG. 4, an operator may provide this information to the central control entity by configuration. Another option would be that the data plane application registers in the central control entity as well.

Furthermore, the central control entity 200 has knowledge, e.g. by configuration or by look-up in a subscriber database, which data plane application has to be applied for a certain data plane flow. By way of example, the knowledge about that data plane application to be applied may be obtained by configuration. An operator of the radio access network can configure for example that all HTTP traffic has to be inspected if it contains a voice over IP call. This implies that the packet inspection as a data plane function is applied. The outcome of the inspection may be reported to the central control entity. Another option is based on parameter retrieved in the call/connection processing.

The central control entity 200 then instructs the forwarding elements to route the particular data flow through the required data plane applications. This can be a single data plane application for a particular flow or, it can be multiple data plane applications in a predefined order.

In FIG. 5 it is schematically shown how the central control entity 200 controls different forwarding elements in the H-RAN and the L-RAN. The data plane flow is shown by the full lines, the control plane flow is shown by the dashed lines.

Figure 6:
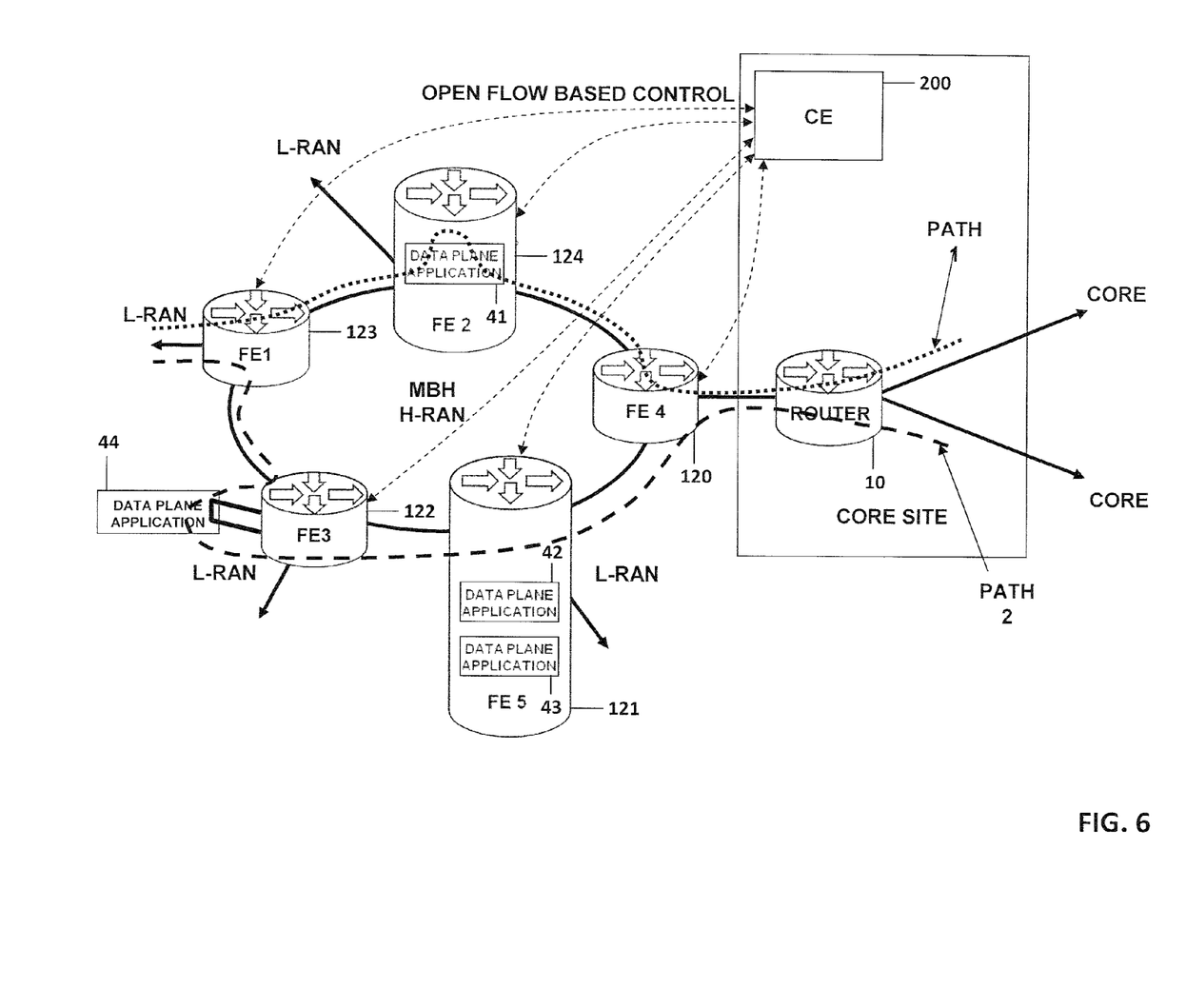
FIG. 6 shows a schematic view of an example of a data flow path through the required date plane applications of forwarding elements provided in a ring topology.

In connection with FIG. 6 an example is shown where a data plane application such as application 41 should be applied to data plane flow. As indicated by path 1 in the dotted line, if the required data plane function is available on forwarding element 124 of the H-RAN ring, the central control entity 200 instructs forwarding element 123 to forward the data plane flow to forwarding element 124, forwarding element 124 then, on the instruction of the central control entity 200 applies the internal data plane application and then forwards the data plane flow to the core site via forwarding element 120.

In an alternative, looking at path 2 the data plane application is now available on forwarding element 122 and the control entity 200 instructs the forwarding element 123 to forward the data plane flow to forwarding element 122 and forwarding element 122 applies the external data plane application 44 on instructions of the CE 200 and then forwards the data plane to the core site.

The central control entity 200 is further able to determine the load of the different data plane applications. Thus, when a certain data plane application is added to different forwarding elements, the central control entity may determine the path in such a way that the data plane application is used that has a lower load. This means that the central control entity can choose between two alternative paths, based on e.g. a load sharing algorithm or based on load feedback from the different data plane applications.

The same way, the central control entity 200 can precisely steer the flow between the forwarding elements to route the data plane of particular flows to the places where the required data plane application is located. However, this means that the central control entity can control the forwarding elements in such a way that distributed data applications can be effectively utilized.

Figure 7:
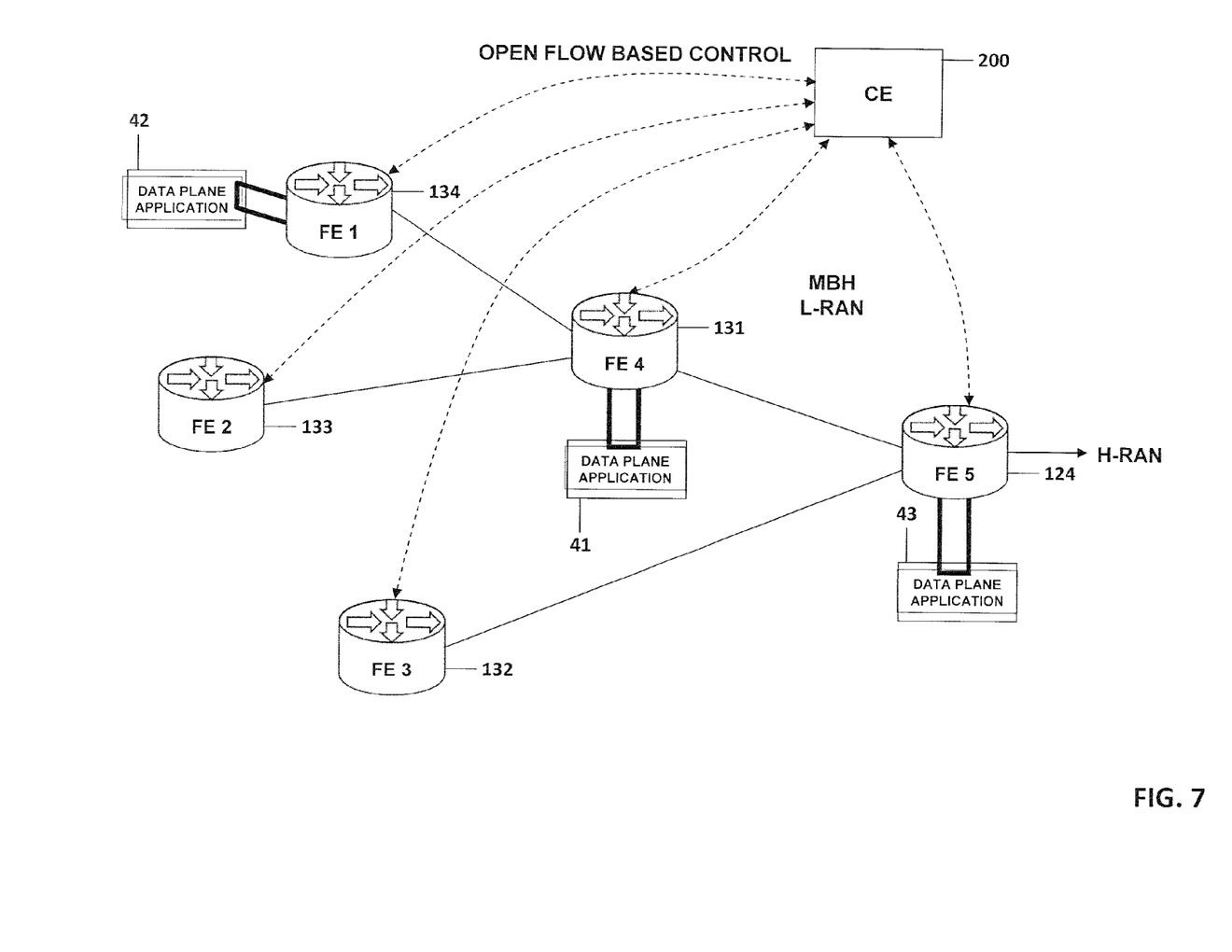
FIG. 7 shows an example of allocating data plane applications attached to forwarding elements having a tree topology.

In the embodiment shown in FIG. 7 the central control entity 200 the data plane applications can be deployed in the L-RAN. In the embodiment it is assumed that the forwarding elements of the L-RAN are not capable of hosting data plane applications. Thus, as shown in FIG. 7 all data plane applications are depicted as external functions. However, it should be understood that the forwarding elements in the L-RAN may also include the data plane application as shown in connection with FIG. 4 for forwarding element 121 and 124.

All the forwarding elements shown in FIG. 7 may have cell sites connected. As can be seen from FIG. 7 all the forwarding elements are controlled by the central control entity 200. Forwarding element 123 connects the L-RAN tree structure to the H-RAN ring. In the example shown data plane applications are deployed next to forwarding element 134, 131 and 123. The central control entity 200 which is the same central control entity shown in FIG. 4 instructs the forwarding element to route a particular data flow through the required data plane applications. Looking at path 1 shown in FIG. 8, if a particular data plane function is available on forwarding element 131, the central control entity 200 instructs forwarding element 133 to forward the data plane flow to forwarding element 131, forwarding element 131 applying the data plane application on instructions of the CE 200 and then forwards the data plane flow to the H-RAN via forwarding element 123.

Figure 8:
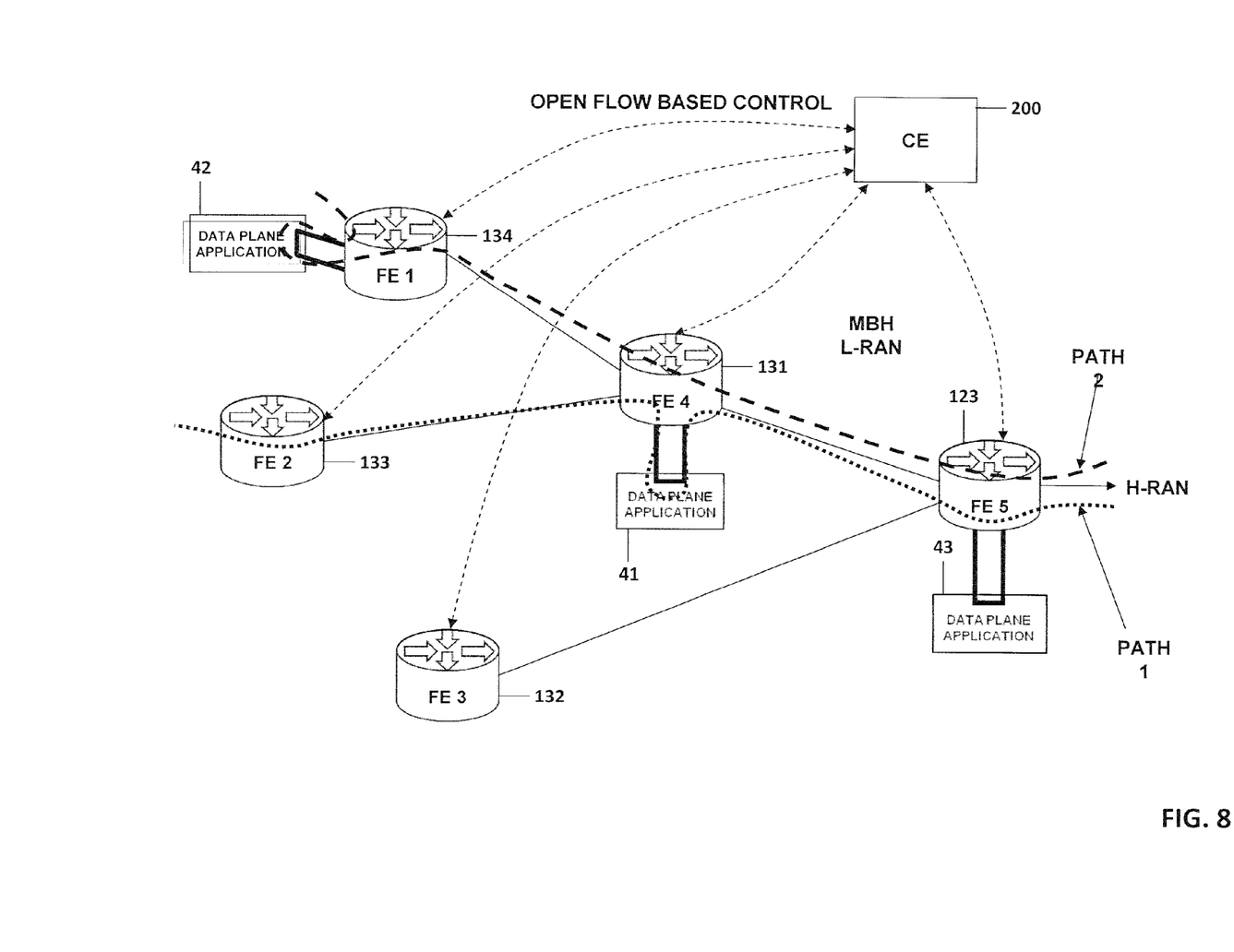
FIG. 8 shows an example of different data plane flows in forwarding elements with a topology as shown in FIG. 7.

Now looking at path 2 of FIG. 8, the data plane application is available on forwarding element 134. The central control entity instructs forwarding element 134 to apply the data plane application and forward the data flow via element 131 and 123 to the H-RAN. As shown in FIG. 8, the data plane flow passing through forwarding element 131, path 2 will not go through the data plane application connected to forwarding element 131 as this has been performed already. In another embodiment, not shown in the Figure, the central control entity 200 may instruct forwarding element 134 not to use the attached local data plane application, but to use the same data plane application in forwarding element 131 instead.

As can be seen from the examples above, the central control entity 200 can flexibly use the distributed data plane applications in the H-RAN and L-RAN. This allows to support multiple data plane applications and to scale single data plane applications in a much better way.

The data plane application may be implemented in dedicated, specific or optimized hardware deployed at a particular forwarding element. The data plane application may also be a generic software which can be programmed into generic hardware.

Figure 9:
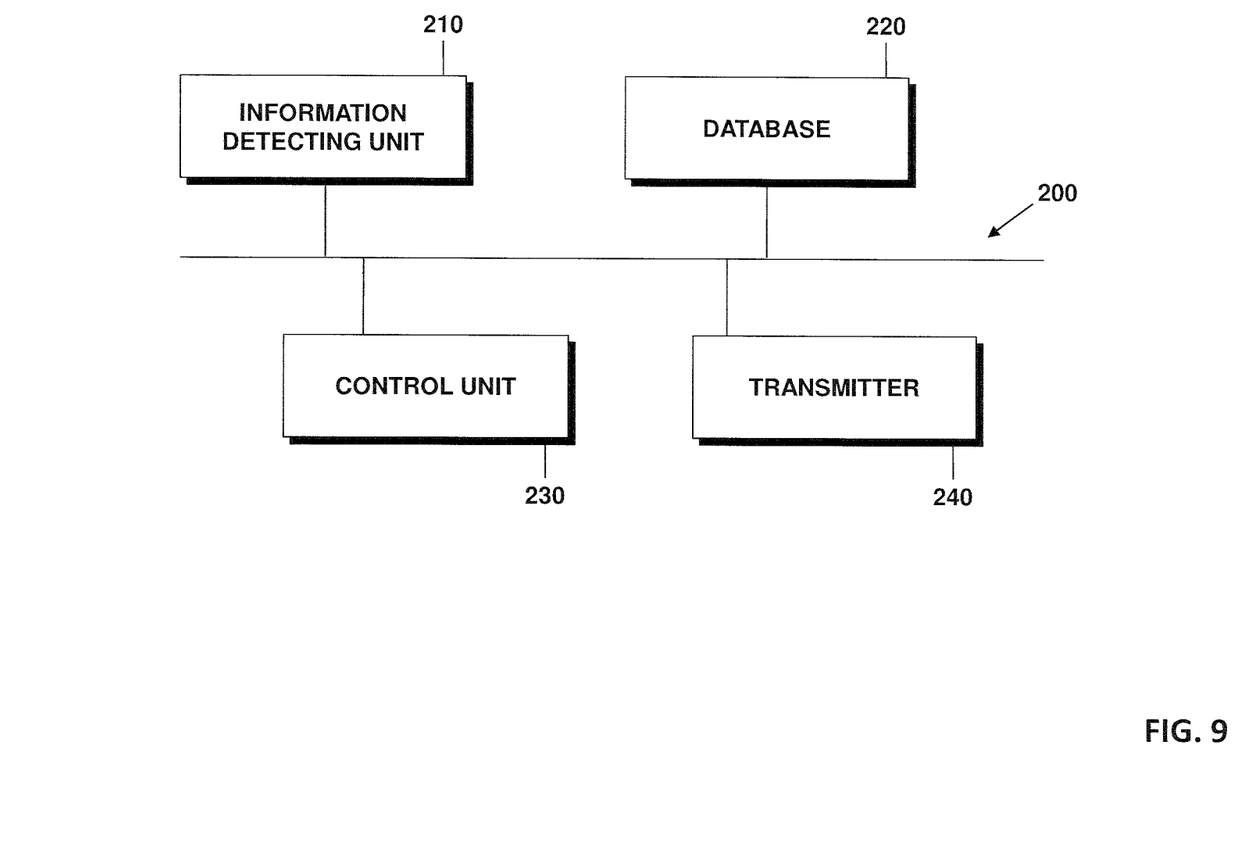
FIG. 9 is a schematic view of a central control entity configured to control the path of the data plane flows.

In connection with FIG. 9 a central control entity 200 is schematically shown which controls the data plane flow. The central control entity 200 contains the information detecting unit 210 detecting information which data plane application should be applied to which data plane flow. As mentioned above, the forwarding elements will register at the central control entity and the central control entity 200 can detect the information which data plane application is attached to a forwarding element. This information, an information about the topology of the radio access network may be stored in database 220.

Furthermore, the control unit 230 is provided that controls the path of the data plane flow through the forwarding elements as described above. The commands to the forwarding elements are transmitted to the forwarding elements using transmitter 240.

Figure 10:
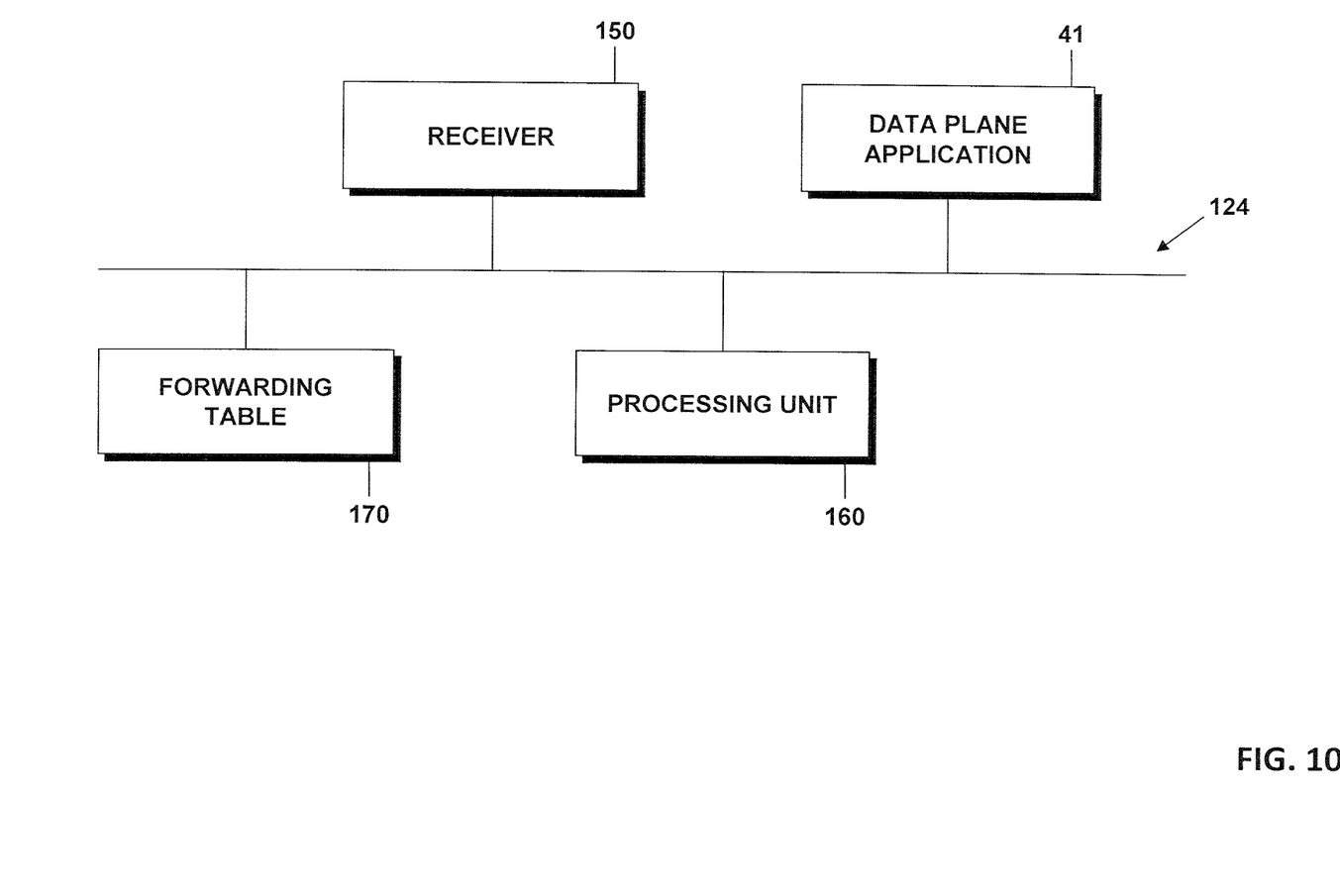
FIG. 10 is a schematic view of forwarding element with an attached data plane application that passes a data plane flow through an application in accordance with the instructions received from the central control entity.

In FIG. 10 an example of a forwarding element 124 is schematically shown, the forwarding element comprising a receiver 150 to receive the instructions from the central control entity transmitted via transmitter 240. The forwarding element contains a forwarding table 170 where the information is contained to which other node the data plane flow should be passed. The central control entity 200 transmits updating commands to the forwarding table 170 to control the data plane flow in the forwarding element. In the example shown the forwarding element of FIG. 10 contains attached a data plane application 41 which may be incorporated into forwarding element or may be connected to the forwarding element. Furthermore, a processing unit 160 is provided that processes the commands received from the central control entity and controls the forwarding element in such a way that the commands are executed as required. If instructed, the processing unit will pass the flow through the data plane application 41 in accordance with instructions received from the control entity 200.

It should be understood that the central control entity and the forwarding element shown in FIGS. 9 and 10 may contain additional components. For the sake of clarity only the components or functional entities are shown which are needed for the understanding of the invention. Furthermore, the components shown may be incorporated in another composition than shown, e.g. two of the components may be incorporated into a single unit. Furthermore, the components shown may be incorporated by hardware or a software or by a combination of hardware and software.

As a control protocol between the central control entity and the forwarding elements OpenFlow may be used. OpenFlow uses a data plane flow defined as a stream of packages as controllable item. In this context, a data plane flow is a detectable and identifiable stream of packets and only identifiable streams can be subject to forwarding in the forwarding table.

In a 3 GPP world of the radio access network a bearer is used as a kind of bit pipe through the IP network, the bearer having a defined quality of service QoS/QSI (Queue State Information) meaning a defined latency, bit rate, error rate, delay etc. Inside the bearer, multiple data flows are distinguished but they all have the same QoS in the guaranteed or best effort bit rate inside the bearer bit rate. Bearer set-up and controlling is mostly done by MPLS (Multi Protocol Label Switching) and secure tunnelling.

The data plane flow may be considered as a bearer and in this case the bearer and the data plane flow have the same routing paths and the data flows in the bearer will follow the same path and has the same QoS/QCI (QoS Class Identifier). Applications will address a data flow inside the bearer. The central control entity in this example steers the bearer, so it needs to route the data plane flow via each forwarding element with attached application that requires access to a data flow in the bearer. The data plane flow may also be a data flow inside a bearer if such a stream were detectable and identifiable by the forwarding element. This would make the routing path less complex as the number of applications to be visited and the path is much less as each data plane flow in a bearer can be handled separately.

Figure 11:
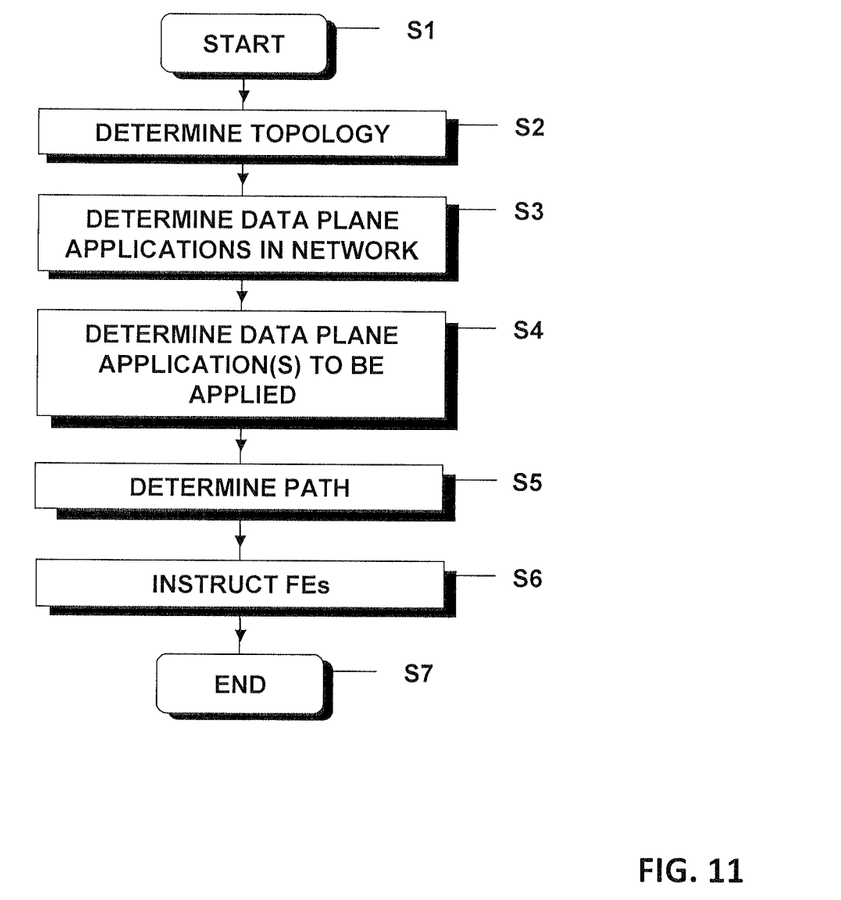
FIG. 11 is a flow-chart showing the steps for controlling a path of the data plane flow through the radio access network part.

In FIG. 11 the steps are summarized that may be carried out to control a data plane flow. The method starts in step S1 and in step S2 the topology of the radio access network part is determined by the central control entity. In an additional step S3 the data plane applications attached to the different forwarding elements are determined. When a certain data plane flow should be passed through the radio access network, the data plane application or the data plane applications that should be applied are determined in step S4. Based on the knowledge of the topology and based on the knowledge which data plane application is attached to which forwarding element the path of the data plane flow through the network can be determined in step S5. When the path has been determined the forwarding elements in the path can be instructed to forward the data plane flow along its path and to apply a data plane application if required. The method ends in step S7.

When the data plane application is a generic software, the data plane application can also be deployed in a dynamic fashion, i.e. depending on the demand in the network more generic hardware is activated and programmed to provide missing data plane applications. Furthermore, data plane application hardware that is not utilized very often may be shut down for power saving reasons. Furthermore, the central control entity can seize the required data plane application at some other place of the radio access network.

The described invention offers a scalability for data plane applications as a data plane application may be added to different forwarding elements. Furthermore, support is provided for multiple data plane applications as the applications may be distributed over the radio access network. This allows a cheaper placement of processing intensive data plane functions and a load sharing between several implementations of the data plane function. Furthermore, energy can be saved by dynamic reconfiguration of the data plane flows.

The invention claimed is:

1. A central control entity configured to control a data plane flow of a stream of data packages in a radio access network part of a mobile communications network, the central control entity comprising processing circuitry configured to:
   detect information about data plane applications attached to forwarding elements of the radio access network part and detect information about at least one data plane application that is to be applied to said data plane flow, wherein, based on using subscriber data, the central control entity has knowledge of which data plane application has to be applied to said data plane flow;
   determine a path of the data plane flow through the forwarding elements of the radio access network part, based on taking into account said at least one data plane application to be applied to said data plane flow; and
   instruct the forwarding element in the path, to which said at least one data plane application is attached, to pass the data plane flow through said at least one data plane application.

2. The central control entity according to claim 1, wherein the processing circuitry is configured to determine the data plane applications to be applied to said data plane flow, and to instruct the forwarding elements to pass the data plane flow through the corresponding data plane applications.

3. The central control entity according to claim 2, wherein the processing circuitry is configured to determine the path through the forwarding elements, to which the determined data plane applications are attached, so that the data plane applications are applied to said data plane flow in a predefined order.

4. The central control entity according to claim 1, wherein the processing circuitry is configured to detect information about a topology of the radio access network part.

5. The central control entity according to claim 1, wherein the processing circuitry is configured to detect information about load feedback from the data plane applications attached to the forwarding elements.

6. The central control entity according to claim 5, wherein, when one data plane application is attached to different forwarding elements, the processing circuit is configured to determine the path of the data plane flow taking into account the load feedback from the different forwarding elements for said one data plane application attached to the different forwarding elements.

7. The central control entity according to claim 1, wherein the processing circuitry is configured to control the forwarding elements in the radio access network part in a section of the network part in which the forwarding elements are arranged in a ring topology or tree topology.

8. The central control entity according to claim 1, wherein the processing circuitry is configured to provide a path for the data plane flow through the data plane, based on said processing circuitry being configured to instruct the forwarding elements how to forward the data plane flow by providing commands to forwarding tables provided in the forwarding elements.

9. The central control entity according to claim 1, wherein the processing circuitry is configured to attach a data plane application to a forwarding element of the radio access network part.

10. A method for controlling, by a central control entity, a data plane flow of a stream of data packages in a radio access network part of a mobile communications network, the method comprising the steps of:
    detecting information about data plane applications attached to forwarding elements of the radio access network part;
    detecting information about at least one data plane application that is to be applied to said data plane flow using subscriber data;
    determining a path of said data plane flow through the forwarding elements of the radio access network part, wherein the path is determined taking into account said at least one data plane application to be applied to said data plane flow; and
    instructing the forwarding element in the path, to which said at least one data plane application is attached, to pass the data plane flow through said at least one data plane application.

11. The method according to claim 10, wherein the data plane applications to be applied to said data plane flow are determined and the forwarding elements are instructed to pass the data plane flow through the corresponding data plane applications.

12. The method according to claim 11, wherein the path through the forwarding elements to which the determined data plane applications are attached is determined so that the data plane applications are applied to said data plane flow in a predefined order.

13. The method according to claim 10, further comprising the step of detecting information about load feedback from one data plane application attached to different forwarding elements, wherein the path through said one data plane application is determined taking into account the load feedback from said one data plane application attached to the different forwarding elements.

14. The method according to claim 10, further comprising the step of attaching, by the central control entity, a data plane application to a forwarding element of the radio access network part.

* * * * *